USO10080421B2

(12) United States Patent
Binding

(10) Patent No.: US 10,080,421 B2
(45) Date of Patent: Sep. 25, 2018

(54) BACKPACK HARNESS FOR SUPPORTING A FOLDING STAND AND OTHER ACCESSORIES

(71) Applicant: Lawrence Binding, Montreal (CA)

(72) Inventor: Lawrence Binding, Montreal (CA)

(*) Notice: Subject to any disclaimer, the term of this patent is extended or adjusted under 35 U.S.C. 154(b) by 0 days.

(21) Appl. No.: 15/399,054

(22) Filed: Jan. 5, 2017

(65) Prior Publication Data
US 2018/0184788 A1 Jul. 5, 2018

(51) Int. Cl.
| A45F 3/14 | (2006.01) |
| A01K 97/06 | (2006.01) |
| F16M 11/38 | (2006.01) |
| A47C 4/00 | (2006.01) |
| A45F 3/00 | (2006.01) |

(52) U.S. Cl.
CPC ............... *A45F 3/14* (2013.01); *A01K 97/06* (2013.01); *A47C 4/00* (2013.01); *F16M 11/38* (2013.01); *A45F 2003/003* (2013.01); *A45F 2003/146* (2013.01)

(58) Field of Classification Search
CPC .......... A45F 2004/026; A45F 2004/006; A45F 2003/003; A45F 2004/045–2004/047; A45F 3/08; A45F 3/10; A45F 3/14; A47C 4/10; A47C 4/20; A47C 4/00; A47C 4/12; A47C 4/22; A47C 4/34; A47C 4/36; A47C 4/44; A47C 4/46; A47C 9/00; A47C 9/04; A47C 9/10; A47C 9/105; A47C 12/00; A47C 16/02; A47C 16/025
USPC ........ 224/583, 155, 581–582, 259, 261–264, 224/271–272, 153, 575–576, 627–659
See application file for complete search history.

(56) References Cited

U.S. PATENT DOCUMENTS

| 5,323,943 A * | 6/1994 | Elledge ..................... A45F 3/14 224/265 |
| 5,628,443 A * | 5/1997 | Deutsch ............... A45C 7/0086 150/113 |
| 7,757,912 B1 * | 7/2010 | Fabro ....................... A47C 4/52 224/153 |
| 2012/0067930 A1 * | 3/2012 | Talavera Tolentino ... A45F 4/02 224/155 |
| 2016/0187096 A1 * | 6/2016 | Hamlin ................. F41B 5/1461 224/257 |

* cited by examiner

*Primary Examiner* — Scott McNurlen
(74) *Attorney, Agent, or Firm* — Dennis L. Thomte; Thomte Patent Law Office LLC

(57) ABSTRACT

A backpack harness for supporting a folding stand thereon as well as other accessories. The folded stand and harness have cooperating elements which enable the folded stand to be selectively removably secured to the harness. The harness may have other accessories selectively removably secured thereto.

3 Claims, 9 Drawing Sheets

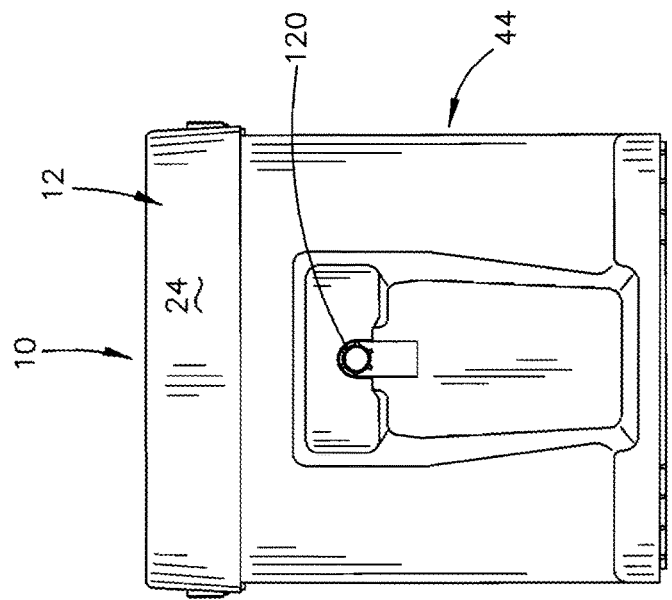
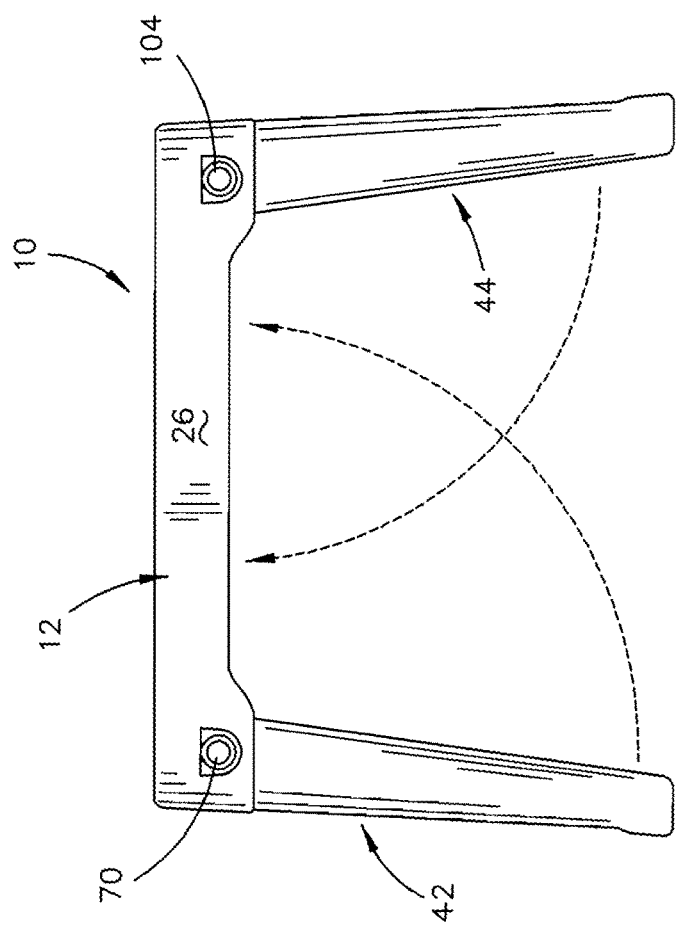
FIG. 4
FIG. 5

BACKPACK HARNESS FOR SUPPORTING A FOLDING STAND AND OTHER ACCESSORIES

BACKGROUND OF THE INVENTION

Field of the Invention

This invention relates to a backpack harness for supporting a folding stand and other accessories such as a tackle box, a folding chair, a hard case backpack, etc. Even more particularly, this invention relates to a backpack harness which is configured to support accessories on either the front side of the backpack harness or the rear side of the backpack harness.

Description of the Related Art

When people attend an outdoor event, such as a concert, parade or rally, it is difficult for persons, other than those persons in the first row of people, to see over the people to witness the event. In some cases, a spectator may hand carry a small chair to stand upon to see over the crowd but it is difficult to hand carry the chair from location to location. Further, there are times when a spectator may wish to take other accessories with him or her, such as a beach chair, a tackle box, a hard case backpack, etc. There is therefore a need to provide a folding stand for a spectator to use at an event to see over the people in front of him/her. There is a further need to provide a convenient means for carrying the folding stand from location to location. There is also a need to provide a means for a person to carry other accessories from location to location.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A folding stand is described which may be used for a person to stand upon to see over other persons at a spectator event. A backpack harness is also described which enables the folding stand, when in its folded position, to be selectively removably secured to the backpack harness so that a person may conveniently carry the folding stand from one location to another. The backpack harness is configured to have other accessories attached thereto. Further, the backpack harness is configured to have an accessory secured to the rearward side of the backpack harness and have another accessory secured to the forward side of the backpack harness.

It is a principal object of the invention to provide a folding stand for use by a spectator to stand on so as to be able to see over the spectators between the person and the event.

A further object of the invention is to provide a backpack harness for carrying the stand when in its folded position.

A further object of the invention is to provide a backpack harness which may be used to have a variety of accessories attached thereto.

A further object of the invention is to provide a backpack harness for carrying a folded stand including novel means for attaching the folded stand to the backpack harness.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 4 is a side view of the stand of this invention in its non-folded position;

FIG. 5 is an end view of the stand of FIG. 4;

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 8 refers to the backpack harness of this invention which includes a coupler system for supporting a folding stand 10 with the harness 8 and coupling system to be described hereinafter. Other accessories may be attached to the harness 8 as will be described hereinafter.

Figure 1:
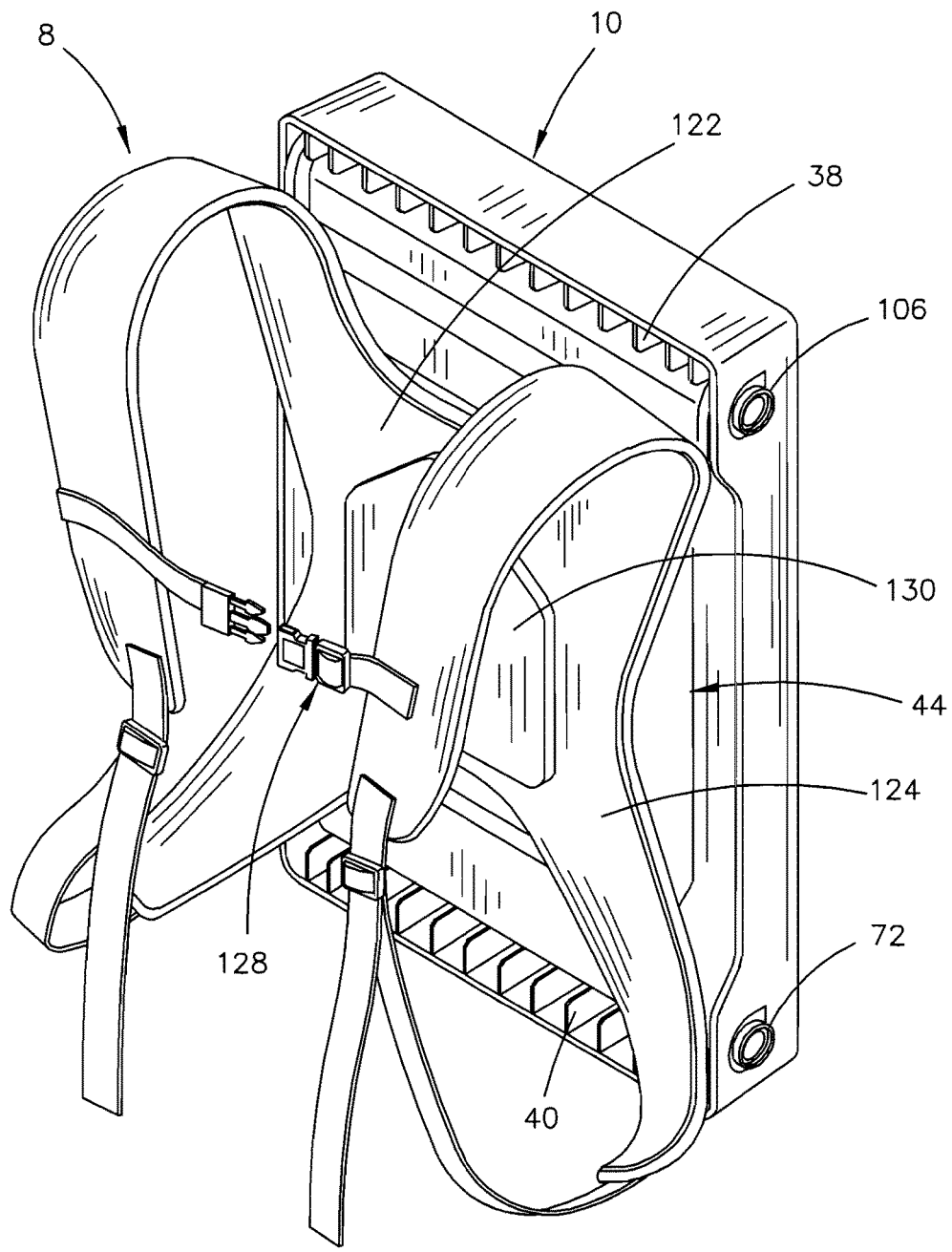
FIG. 1 is a rear perspective view of the backpack harness of this invention having a folded stand selectively removably secured thereto.
Figure 2:
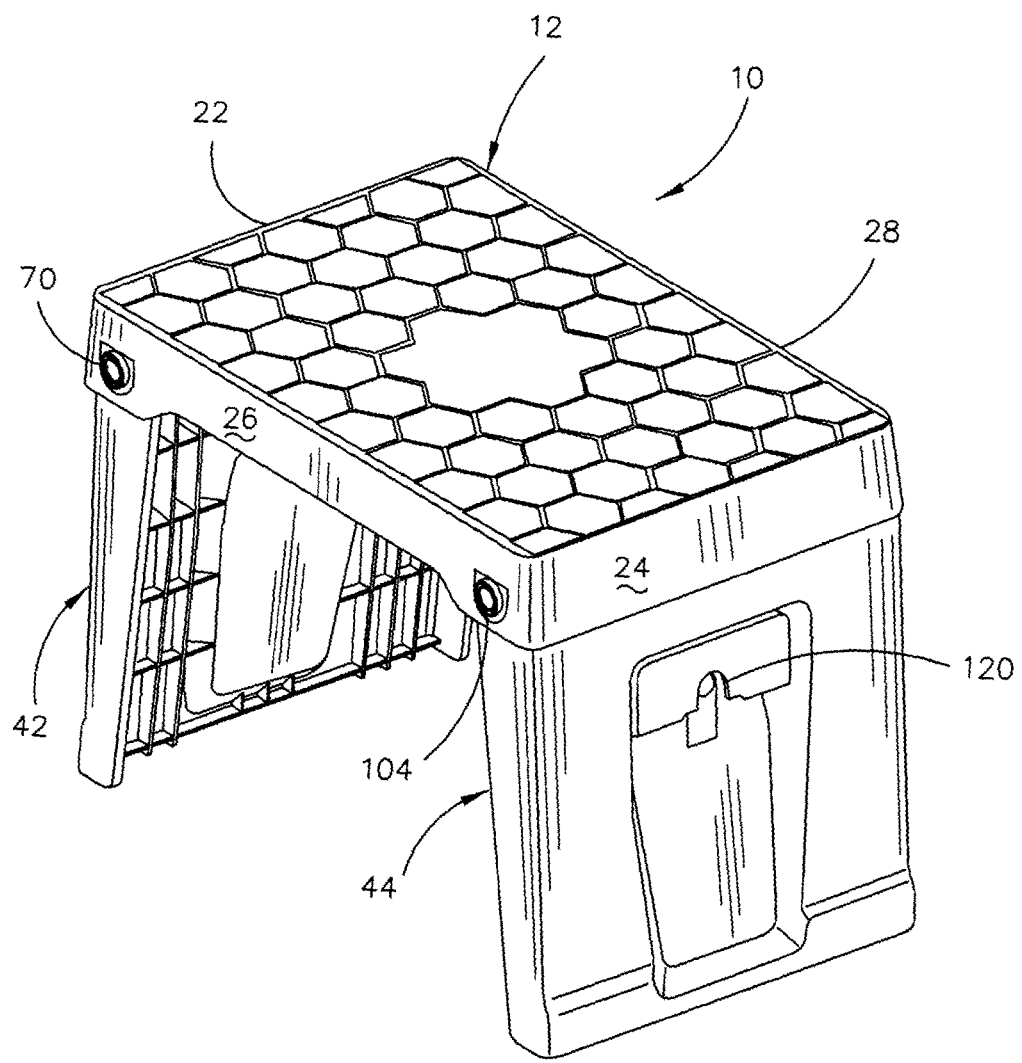
FIG. 2 is a perspective view of the folding stand of this invention which may be secured to the harness of this invention.
Figure 3:
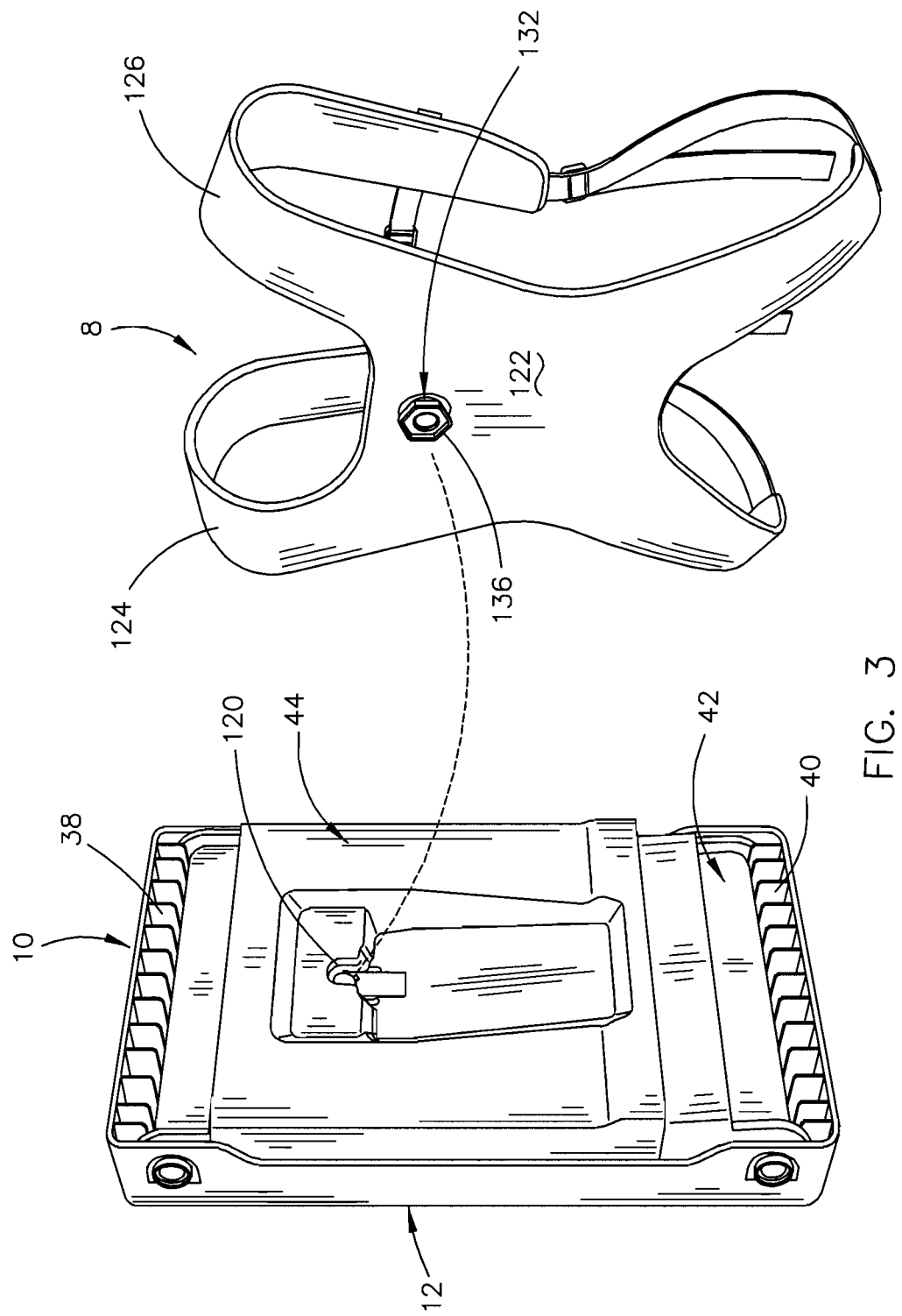
FIG. 3 is an exploded perspective view of the harness of this invention and the folded stand of this invention.
Figure 6:
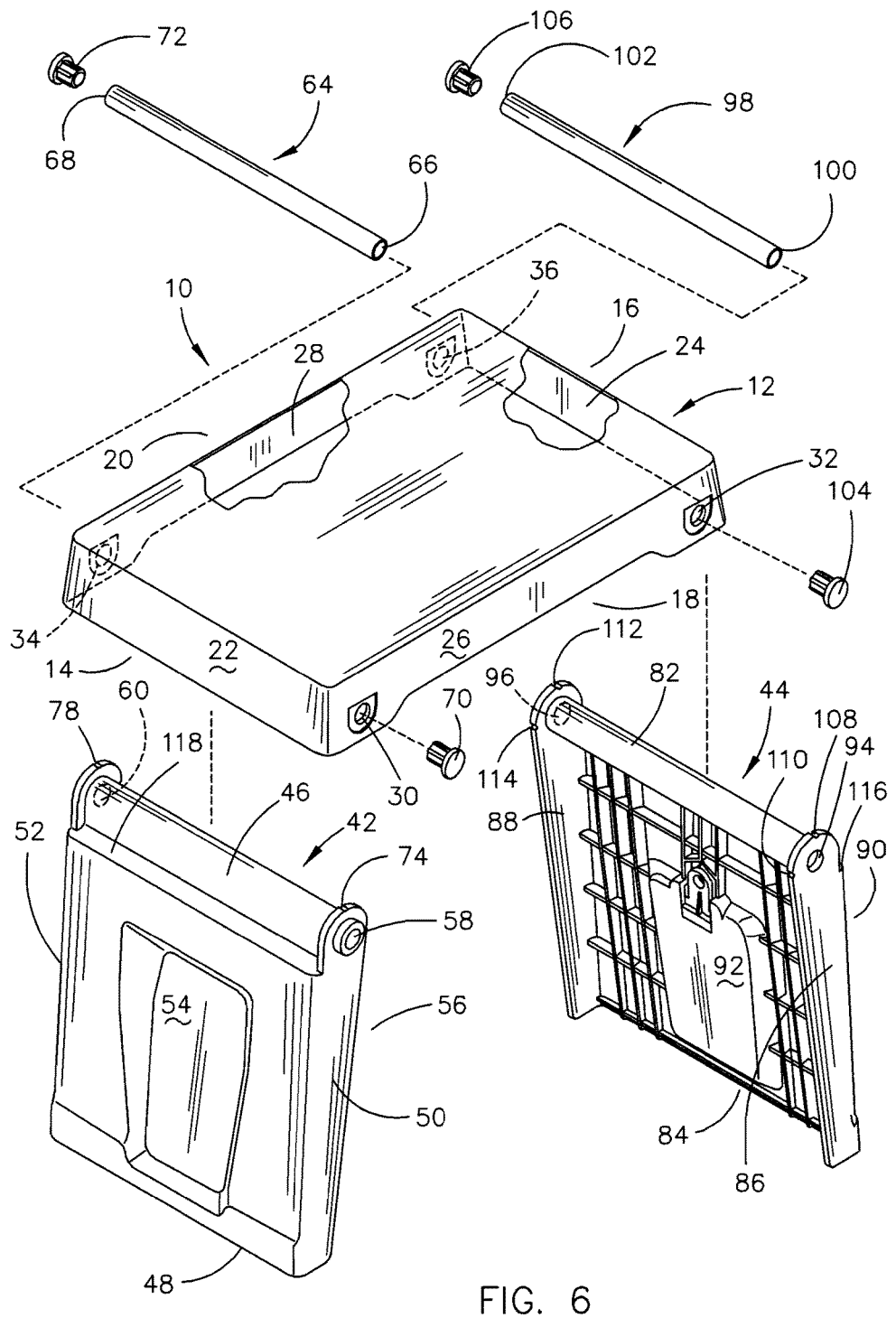
FIG. 6 is an exploded perspective view of the folding stand of this invention.
Figure 7:
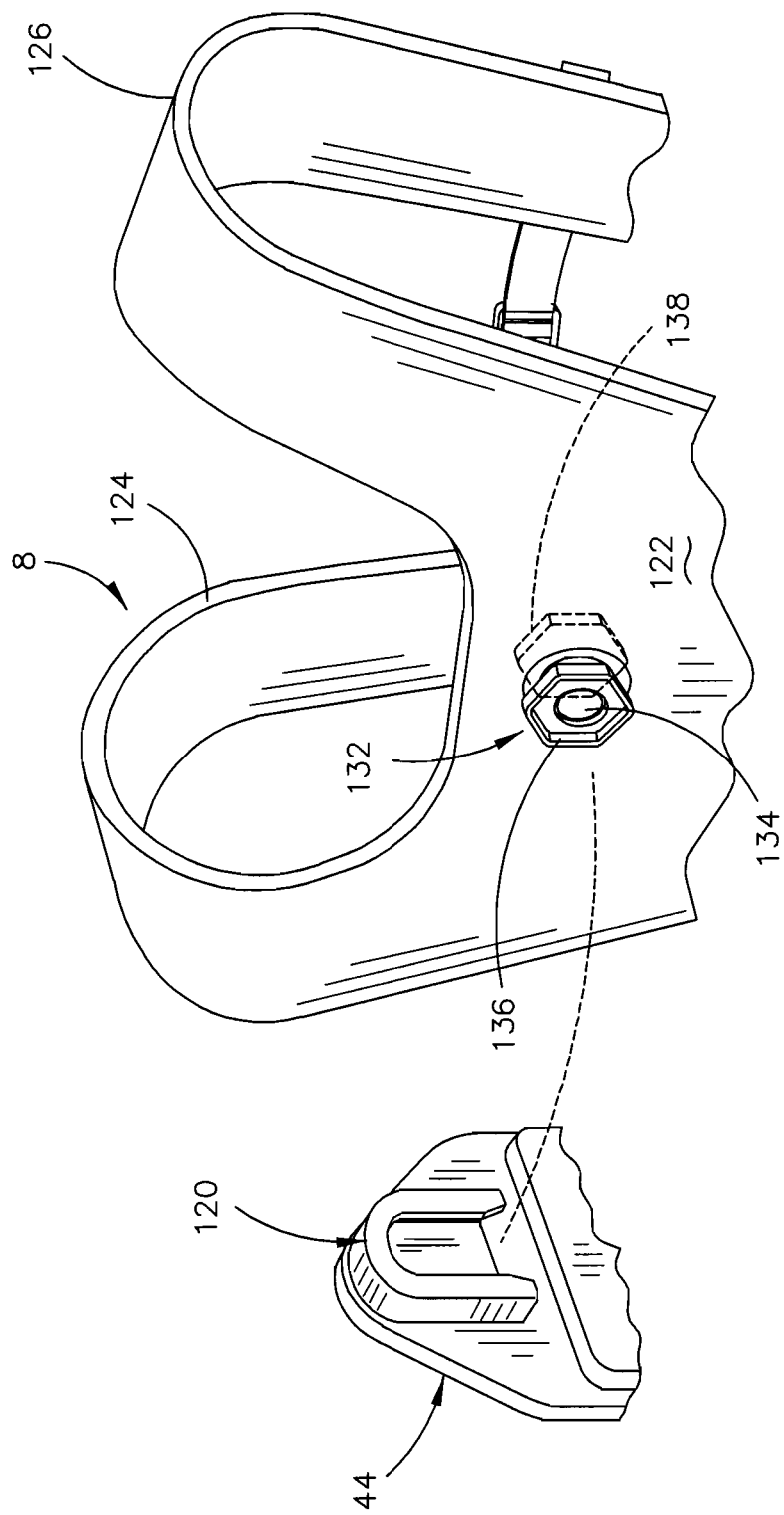
FIG. 7 is a partial exploded perspective view of the harness of this invention.
Figure 8:
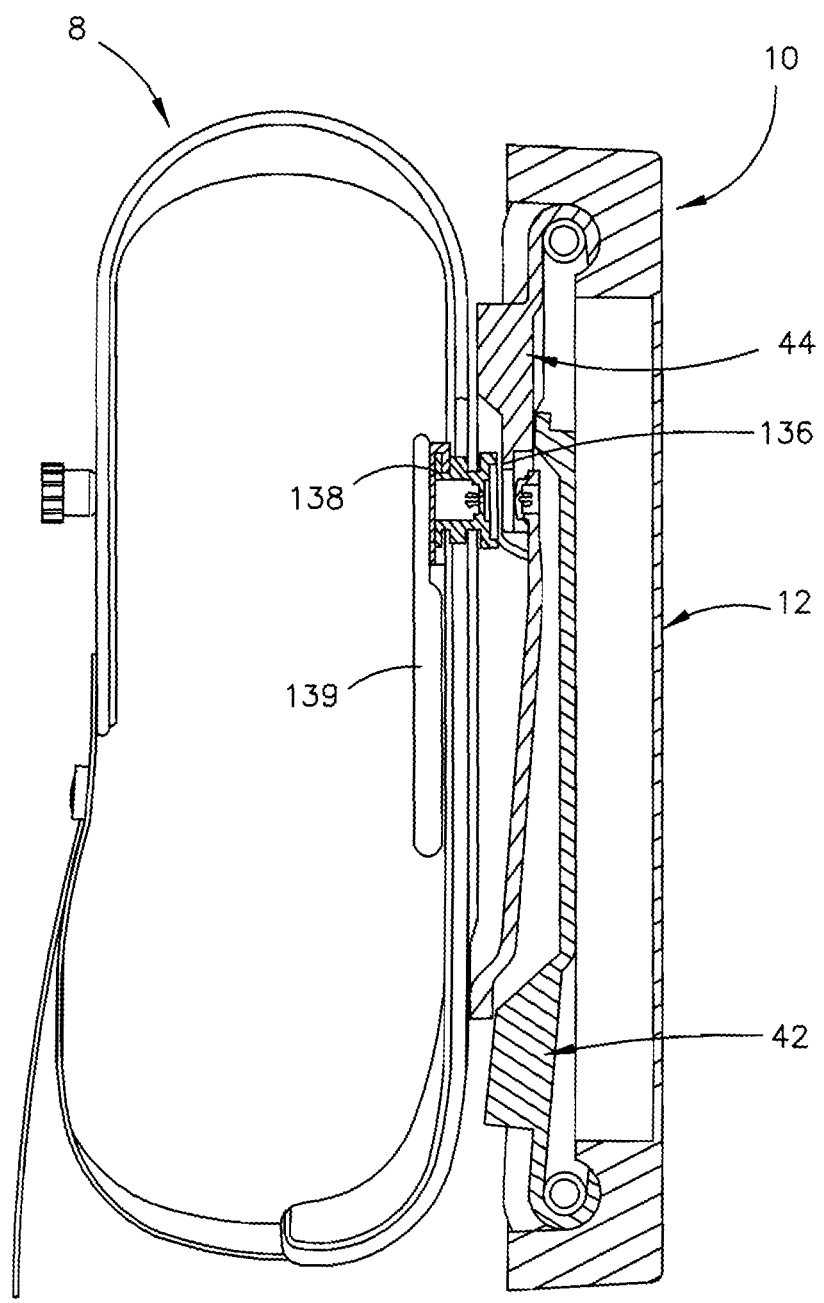
FIG. 8 is a partial sectional view illustrating the folded stand secured to the harness of this invention.

The numeral 10 refers to the folding stand of this invention. Stand 10 includes a support member 12 having a first end 14, a second end 16, a first side 18 and a second side 20. A first flange 22 extends downwardly from the first end 14 of support member 12. A second flange 24 extends downwardly from the second end 16 of support member 12. A third flange 26 extends downwardly from the first side 18 of support member 12. A fourth flange 28 extends downwardly from the second side 20 of support member 12. Flange 26 of support member 12 has openings 30 and 32 formed in its ends as seen in FIG. 6. Flange 28 of support member 12 has openings 34 and 36 formed in its ends as seen in FIG. 2. Preferably, support member 12 has a honeycomb or irregular surface formed on its upper surface. Support member 12 has a row of spaced-apart strengthening ribs 38 extending downwardly from the underside of support member 12 at end 14 and has a row of spaced-apart strengthening ribs 40 extending downwardly from the underside of support member 12 at end 16.

Stand 10 also includes foldable legs 42 and 44. Leg 42 includes a tubular upper end 46, a lower end 48, a first side 50, a second side 52, an outer side 54 and an inner side 56. As seen, the tubular upper end 46 is positioned between the upper ends of sides 50 and 52 which have openings 58 and 60 formed therein respectively which register with openings 30 and 34 formed in flanges 26 and 28 respectively. An elongated hollow tube 64 is positioned in tubular upper end 46 with its ends 66 and 68 registering with openings 30 and 34 of flanges 26 and 28 respectively. A retainer plug 70 extends inwardly through opening 30 in flange 26 and is received by end 66 of tube 64. A retainer plug 72 extends inwardly through opening 34 in flange 28 and is received by end 68 of tube 64. The leg 42 is pivotally movable between folded and extended positions with respect to support member 12. The curved upper end of side 50 has a pair of radially spaced-apart detent grooves or slots 74 and 76 formed therein. The curved upper end of side 52 has a pair of radially spaced-apart detent grooves 78 and 80 formed therein. When leg 42 is in its extended position, the detent slots 74 and 78 receive the lower edge of flange 22 to yieldably maintain leg 42 in its extended position.

Leg 44 includes a tubular upper end 82, a lower end 84, a first side 86, a second side 88, an outer side 90 and an inner side 92. As seen, the tubular upper end 82 is positioned between the upper ends of sides 86 and 88 which have openings 94 and 96 formed therein respectively which register with openings 32 and 36 in flanges 26 and 28 respectively. An elongated hollow tube 98 is positioned in tubular upper end 82 with its ends 100 and 102 registering with openings 32 and 36 in flanges 26 and 28 respectively. A retainer plug 104 extends inwardly through opening 32 in flange 26 and through the end 100 of tube 98. A retainer plug 106 extends inwardly through opening 36 in flange 28 and through the end 102 of tube 98. The leg 44 is pivotally movable between folded positions with respect to support member 12. The curved upper end of side 86 has a pair of radially spaced-apart detent openings or slots 108 and 110 formed therein. The curved upper end of side 88 has a pair of radially spaced-apart detent openings or slots 112 and 114 formed therein.

The lower edge of flange 24 engages stops 116 and 118 formed in sides 86 and 88 to limit the leg 44 from pivoting beyond its desired extended position. The outer side of leg 44 has an inverted U-shaped receptacle 120 formed therein.

Harness 8 includes a central portion 122 having a left adjustable shoulder strap 124 and a right adjustable shoulder strap 126 extending therefrom. Straps 124 and 126 are adjustably selectively secured together by a side buckle assembly 128. Central portion 122 of harness has a flat support member 130 secured to the forward side thereof. A storage pouch may be secured to the forward side of support member 130 for storing keys, etc. therein.

The numeral 132 refers to a double-sided connector which is secured to the support member 130. Connector 132 includes a cylindrical shaft 134 which extends through central portion 122 and support member 130. A hexagonal connector member 136 is mounted on the rearward end of shaft 134 so as to be spaced rearwardly of central portion 122 of harness 8. A hexagonal connector member 138 is mounted on the forward end of shaft 134 so as to be spaced forwardly of support member 130.

FIG. 2 illustrates the stand 10 in its operative supporting position. A person may stand on the stand 10 to see over other spectators. When in its supporting position, the lower end or edge of flange 24 engages stop 116 and the lower end or edge of flange 22 engages stop 118 to limit the outward movement of legs 42 and 44. At that time, the detents 74 and 78 of leg 42 engage structure on the underside of support member 42 to yieldably maintain leg 42 in its operative or extended position. At that time, the detents 108 and 112 of leg 44 engage structure on the underside of support member 12 to yieldably maintain leg 44 in its operative or extended position.

The stand 10 may be folded to its stowed or folded position by first pivotally moving leg 42 inwardly so that the inner side 56 of leg 42 is adjacent the underside of support member 12. At that time, the detents 76 and 80 of leg 42 engage structure on the underside of support member 12 to yieldably maintain leg 42 in its folded or stowed position. The leg 44 is then pivotally moved from its extended or operative position to its stowed position adjacent leg 42. At that time, the detents 110 and 114 of leg 44 engage structure on the underside of support member 12 to yieldably maintain leg 44 in its stowed position.

Figure 9A:
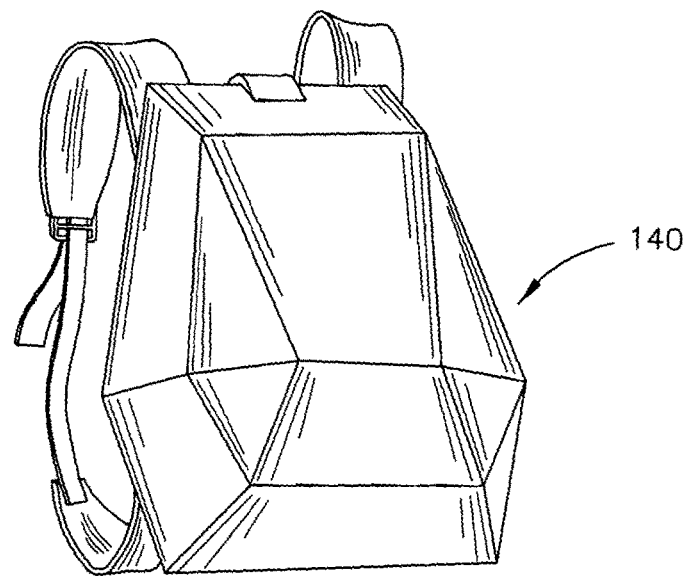
FIG. 9A is a rear perspective view of an accessory such as a hard case backpack secured to the harness of this invention.
Figure 9B:
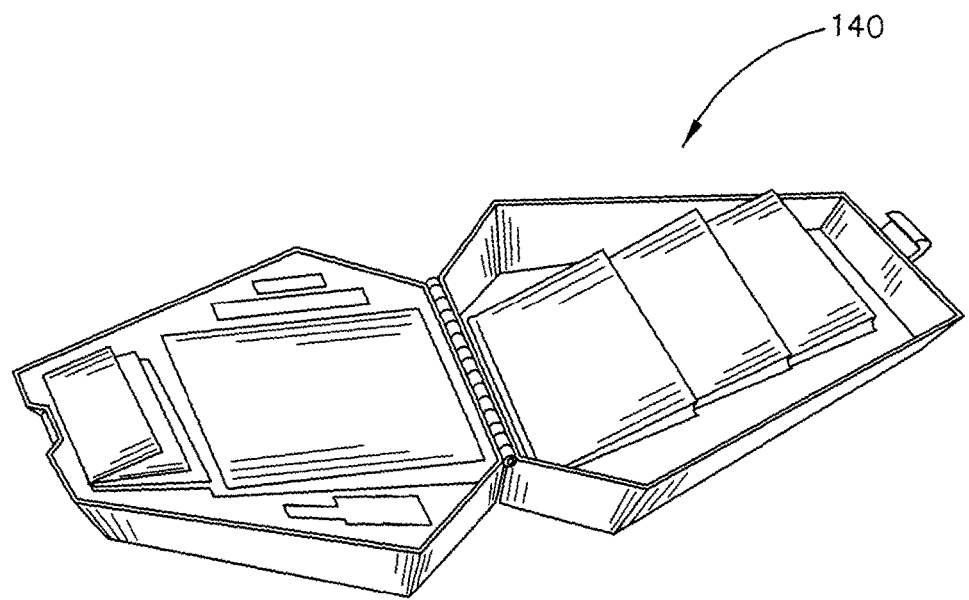
FIG. 9B is a view of the accessory of FIG. 9A in its open position.
Figure 10A:
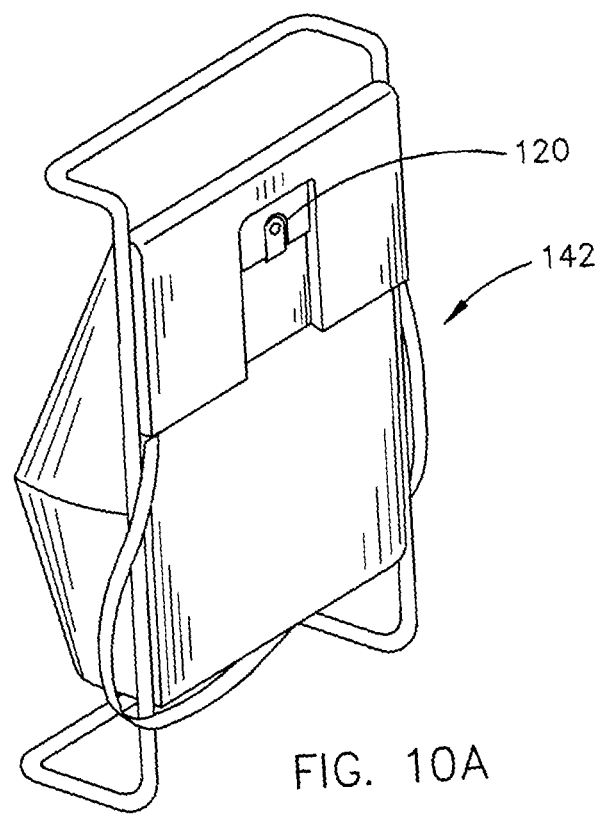
FIG. 10A is a perspective view of an accessory, such as a folding chair, which may be attached to the harness of this invention.
Figure 10B:
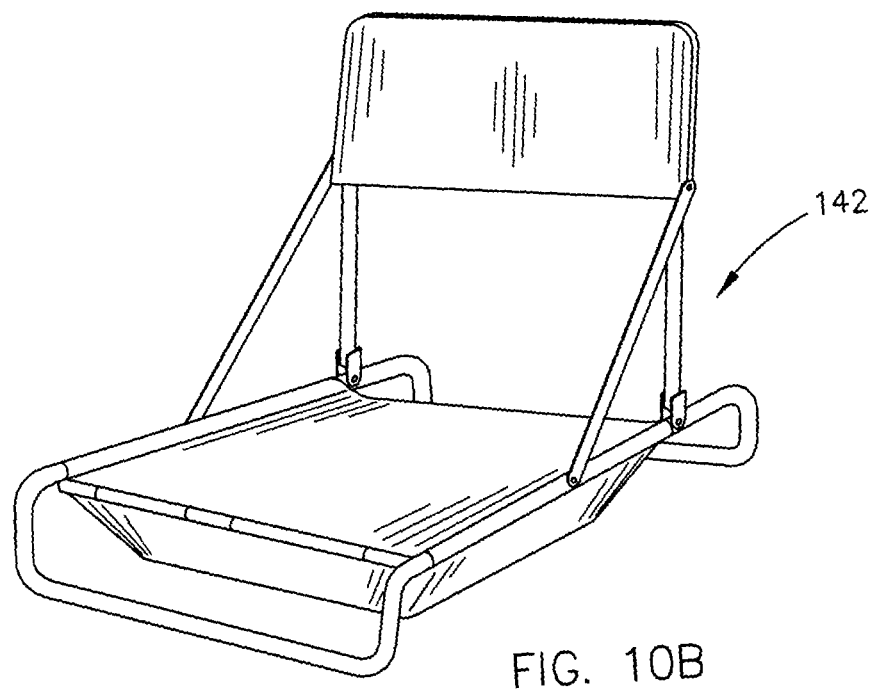
FIG. 10B is a perspective view of the folding chair of FIG. 10A in its non-folded position.

The folded stand 10 may then be attached to the harness by snap-fitting the inverted U-shaped receptacle 120 onto the connector member 136 of connector 132. It should be noted that an accessory could also be attached to the connector member 138 of connector 132 so that both the accessory and the stand 10 could be supported on the harness 8. Further, the stand 10 could be replaced by other accessories such as a hard case backpack 140 as seen in FIGS. 9A and 9B, or a folding beach chair 142 as seen in FIGS. 10A and 10B. Other accessories could also be attached to the harness 8 by simply providing the inverted U-shaped receptacle 120 on the accessory.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:
1. A folding stand, comprising;
a horizontally disposed support member having a first end, a second end, a first side, a second side, an upper side and a lower side;
a first flange having a first end, a second end, an upper end, a lower end, an inner side and an outer side;
said first flange extending downwardly from said first end of said support member;
a second flange having a first end, a second end, an upper end, a lower end, an inner side and an outer side;
said second flange extending downwardly from said second end of said support member;
a third flange having a first end, a second end, an upper end, a lower end, an inner side and an outer side;

said third flange extending downwardly from said first side of support member;

a fourth flange having a first end, a second end, an upper end, a lower end, an inner side and an outer side;

said fourth flange extending downwardly from said second side of said support member;

said third flange having a first opening formed therein at said first end thereof;

said third flange having a second opening formed therein at said second end thereof;

said fourth flange having a first opening formed therein at said first end thereof;

said fourth flange having a second opening formed therein at said second end thereof;

a first leg member having a tubular upper end with first and second ends, a lower end, a first side with upper and lower ends and a second side with upper and lower ends;

said tubular upper end of said first leg member being positioned between said first ends of said third and fourth flanges;

an elongated and hollow first tube having first and second ends;

said first tube being positioned in said tubular upper end of said first leg member;

said upper end of said first side of said first leg member having a first opening formed therein which registers with said first end of said first tube;

said upper end of said second side of said first leg member having a second opening formed therein which registers with said second end of said first tube;

said first opening at said first end of said third flange registering with said first opening in said upper end of said first side of said first leg member;

said first opening at said first end of said fourth flange registering with said second opening in said second side of said first leg member;

a first plug extending through said first opening in said third flange, said first opening in said upper end of said first side of said first leg member into said first end of said first tube;

a second plug extending through said first opening in said fourth flange, said second opening in said upper end of said second side of said first leg member into said second end of said first tube;

a second leg member having a tubular upper end with first and second ends, a lower end, a first side with upper and lower ends, and a second side with upper and lower ends;

said tubular upper end of said second leg member being positioned between said second ends of said third and fourth flanges;

an elongated and hollow second tube having first and second ends;

said second tube being positioned in said tubular upper end of said second leg member;

said upper end of said first side of said second leg member having a first opening formed therein which registers with said first end of said second tube;

said upper end of said second side of said second leg member having a second opening formed therein which registers with said second end of said second tube;

said second opening at second end of said third flange registering with said first opening in said upper end of said first side of said second leg member;

said second opening at said second end of said fourth flange registering with said second opening in said upper end of said second side of said second leg member;

a third plug extending through said second opening at second end of said third flange, through said first opening in said upper end of said first side of said second leg member into said first end of said second tube;

a fourth plug extending through said second opening at said second end of said fourth flange, through said second opening in said upper end of said second side of said second leg member into said second end of said second tube;

said first leg member being selectively pivotally movable between an extended position and a folded position;

said first leg member, when in its said folded position, being positioned adjacent said lower side of said support member;

said second leg member being selectively pivotally movable between an extended position and a folded position;

said second leg member, when in its folded position, being positioned adjacent said first leg member when said first leg member is in its said folded position;

a backpack harness; and said support member and said first and second leg members, when in said folded positions, being selectively removably secured to said backpack harness.

2. The folding stand of claim 1 wherein said backpack harness is configured to support accessories thereon.

3. The folding stand of claim 1 wherein said backpack harness is configured to support accessories thereon in addition to the folding stand.

* * * * *